United States Patent [19]

Aoki et al.

[11] Patent Number: 5,483,016
[45] Date of Patent: Jan. 9, 1996

[54] METHOD FOR PRODUCING BINDER RESIN AND TONER FOR ELECTROPHOTOGRAPHY USING THE BINDER RESIN

[75] Inventors: Katsutoshi Aoki; Eizi Morimoto; Hiroyuki Kawaji; Ken-ichi Suenaga; Tetsuhiro Semura; Kuniyasu Kawabe, all of Wakayama, Japan

[73] Assignee: Kao Corporation, Tokyo, Japan

[21] Appl. No.: 233,405

[22] Filed: Apr. 26, 1994

[30] Foreign Application Priority Data

Apr. 27, 1993 [JP] Japan .................................. 5-101114

[51] Int. Cl.$^6$ ............................ C08F 20/10; G03G 5/04; G03G 9/087
[52] U.S. Cl. .................. 526/318.45; 430/96; 430/109; 526/206; 526/209; 526/210; 526/213; 526/216; 528/86; 528/271; 528/272; 528/288
[58] Field of Search ............................ 526/318.45, 213, 526/216; 430/96

[56] References Cited

FOREIGN PATENT DOCUMENTS 0195604  9/1986  European Pat. Off. .
0479275  4/1992  European Pat. Off. .

OTHER PUBLICATIONS

English abstract of JP-B-57-493, Jan. 1982.
English abstract of JP-A-49-65232 Jun. 1974.
English abstract of JP-A-50-28840 Mar. 1975.
English abstract of JP-A-50-81342, Jul. 1975.
English abstract of USP 3,590,000, Feb. 1971.
English abstract of JP-A-50-44836, Apr. 1975.
English abstract of JP-A-57-37353, Mar. 1982.
English abstract of JP-A-57-109875, Jul. 1982.
English abstract of JP-A-49-6931, Jan. 1974.
English abstract of JP-A-54-114245, Sep. 1979.
English abstract of JP-A-161464, Jun. 1990.
English abstract of JP-A-56-116043, Sep. 1981.
English abstract of JP-A-57-60339, Apr. 1982.
English abstract of JP-A-63-279265, Nov. 1988.
English abstract of JP-A-1-156759 Jun. 1989.
English abstract of JP-A-2-5073, Jan. 1990.
English abstract of JP-A-59-45453, Mar. 1984.
English abstract of JP-A-2-29664, Jan. 1990.
English abstract of JP-A-2-881, Jan. 1990.
English abstract of JP-A-4-142301 May 1992.
Database WPI, Derwent Publications Ltd., London, GB; AN 92-116040 [15], Week 9226, & JP-A-4 142 301, 15 May, 1992.

*Primary Examiner*—Fred Zitomer
*Attorney, Agent, or Firm*—Birch, Stewart, Kolasch & Birch

[57] ABSTRACT

The method of producing a binder resin has the steps of blending in advance (a) a starting material monomer mixture for two polymerization reaction types, (b) a compound which can react with both of starting material monomers for the two polymerization reaction types, and (c) a tricarboxylic or higher polycarboxylic acid or a derivative thereof, the two polymerization reaction types having independent reaction paths to each other in one reaction vessel; and concurrently carrying out the two polymerization reactions in one reaction vessel to give the binder resin. According to the present invention, the binder resin which has an excellent environmental stability in the tribo electric charge and the image quality, and also has good pulverizability and transparency can be produced. Moreover, in a fixing method using a heat roller, fixing at a low temperature can be performed without using an offset inhibiting liquid. By using such a binder resin, a toner for electrophotography and a developer having excellent performance can be obtained.

11 Claims, No Drawings

METHOD FOR PRODUCING BINDER RESIN AND TONER FOR ELECTROPHOTOGRAPHY USING THE BINDER RESIN

BACKGROUND OF THE INVENTION

1. Field of the Invention

The present invention relates to a method for producing a binder resin having an excellent environmental stability with respect to the tribo electric charge and the image quality, and it also relates to a toner for electrophotography using such a binder resin.

2. Discussion of the Related Art

As described in U.S. Pat. Nos. 2,297,691 and 2,357,809 and other publications, conventional electrophotography comprises the steps of forming an electrostatic latent image by evenly charging a photoconductive insulating layer and subsequently exposing the layer to eliminate the charge on the exposed portion and visualizing the formed image by adhering colored charged fine powder known as a toner to the latent image (a developing process); transferring the obtained visible image to an image-receiving sheet such as a transfer paper (a transfer process); and permanently fixing the transferred image by heating, pressure application or other appropriate means of fixing (a fixing process).

Therefore, a toner must meet the requirements not only in the development process but also in the transfer process and fixing process.

Generally, a toner undergoes mechanical frictional forces due to shear force and impact force during the mechanical operation in a developer device, thereby deteriorating after copying from several thousands to several ten thousands of sheets. Such deterioration of the toner can be prevented by using a tough resin having such a high molecular weight that it can withstand the above mechanical friction. However, this kind of a resin generally has such a high softening point that the resulting toner cannot be sufficiently fixed by a non-contact method such as oven fixing or radiant fixing with infrared rays, because of its poor thermal efficiency. Further, when the toner is fixed by a contact fixing method such as a heat roller fixing method, which is excellent in thermal efficiency and therefore widely used, it becomes necessary to raise the temperature of the heat roller in order to achieve sufficient fixing of the toner, which brings about such disadvantages as deterioration of the fixing device, curling of paper and an increase in energy consumption. Furthermore, the resin described above is poor in pulverizability, thereby remarkably lowering the production efficiency of the toner upon the production of the toner. Accordingly, the binder resin having too increased degree of polymerization and also too high softening point cannot be used.

Meanwhile, according to the heat roller fixing method, the surface of a heat roller contacts the surface of a visible image formed on an image-receiving sheet under pressure, so that the thermal efficiency is excellent and therefore widely used in various copying machines from high-speed ones to low-speed ones. However, when the surface of a heat roller contacts the surface of the visible image, the toner is likely to cause such a problem which is a so-called "offset phenomenon," wherein the toner is adhered to the surface of the heat roller, and thus transferred to a subsequent transfer paper. In order to prevent this phenomenon, the surface of a heat roller may be coated with a material excellent in release properties, such as a fluororesin, or a releasing agent such as a silicone oil may be applied on the surface of a heat roller. However, the method of applying a silicone oil, necessitates a larger-scale fixing device, which is not only expensive but also complicated, which in turn may undesirably bring various problems.

Processes for improving the offset phenomenon by unsymmetrizing or crosslinking the resins have been known (see Japanese Patent Examined Publication No. 57-493 and Japanese Patent Laid-Open Nos. 50-44836 and 57-37353), but the fixing temperature has not yet been improved by these processes.

Since the lowest fixing temperature of a toner is generally between the temperature of low-temperature offsetting of the toner and the temperature of the high-temperature offsetting thereof, the serviceable temperature range of the toner is from the lowest fixing temperature to the temperature for high-temperature offsetting. Accordingly, by lowering the lowest fixing temperature as much as possible and raising the temperature causing high-temperature offsetting as much as possible, the serviceable fixing temperature can be lowered and the serviceable temperature range can be widened, which enables energy saving, high-speed fixing and prevention of curling of paper.

From the above reasons, the development of a binder resin and a toner excellent in fixing ability and offset resistance have always been desired.

In order to meet the requirements described above, in cases where styrene resins are used as binder resins, methods in which paraffin waxes, low-molecular weight polyolefins and the like are added as offset inhibitors have been known (see Japanese Patent Laid-Open No. 49-65232, 50-28840 and 50-81342). In these references, however, such problems arise that when the amount of the offset inhibitors added are small, sufficient effects cannot be achieved by the addition thereof, and that when it is large, the deterioration of the obtained developers is undesirably rapid.

The polyester resins have inherently good fixing ability, and as disclosed in U.S. Pat. No. 3,590,000, the toner using it can be sufficiently fixed even by a non-contact type fixing method. However, since the offset phenomenon is likely to take place, it has been difficult to use these polyester resins in the heat roller fixing method. Attempts using polycarboxylic acids have been made to improve the offset resistance in the polyester resins (see Japanese Patent Laid-Open Nos. 50-44836, 57-37353 and 57-109875). However, in these methods, a sufficiently good offset resistance to a practical level cannot be achieved, and even if such a good offset resistance is achieved, the low-temperature fixing ability inherently owned by the polyester resins is in turn deteriorated, and the pulverizability of the resin itself and that of the mixed material in the toner production become poor.

In order to achieve a high resolution in the electrophotographic method, attempts have been made to make the particle diameter of the toners small. However, there have been some problems in finding out how to surely obtain toners with a small particle diameter at a low cost.

Also, in the case where the polyester resin has a certain acid value and a certain hydroxyl value so as to particularly provide good dispersion of the coloring agent, much restriction is placed in toner compositions when compared with the case where the styrene-acrylic resin is used in order to maintain a good environmental stability in the tribo electric charge and the image quality after the production of toners.

In order to solve the above problems, the following methods for blending polyester resins with styrene-acrylic resins have been known. For instance, examples of such methods include:

(1) Methods for blending polyester resins with styrene-acrylic resins (see Japanese Patent Laid-Open Nos. 49-6931, 54-114245, 57-70523, and 2-161464);

(2) Methods for chemically binding polyester resins with styrene-acrylic resins (see Japanese Patent Laid-Open No. 56-116043);

(3) Methods for copolymerizing unsaturated polyesters with vinyl monomers (see Japanese Patent Laid-Open Nos. 57-60339, 63-279265, 1-156759 and 2-5073);

(4) Methods for copolymerizing polyester resins having an (meth)acryloyl group with vinyl monomers (see Japanese Patent Laid-Open No. 59-45453);

(5) Methods for copolymerizing reactive polyesters with vinyl monomers in the presence of polyester resins (see Japanese Patent Laid-Open No. 2-29664); and (6) Methods for forming a block copolymer by binding polyester resins and vinyl resins with an ester bond (see Japanese Patent Laid-Open No. 2-881).

However, since the polyester resins have inherently poor compatibility with the styrene-acrylic resins, mere mechanical blending of the components may result in causing such troubles as background in the formed images of the toner produced in certain blending ratios. Further, in the case where the vinyl monomers are copolymerized with the reactive polyesters, it is applicable only in a restricted compositional range in order not to allow gelation to take place.

Also, a method in which a starting monomer mixture for two polymerization reaction types are blended in advance and the two polymerization reactions are concurrently carried out has been proposed (see Japanese Patent Laid-Open No. 4-142301). Although the binders for toner production disclosed herein have an islands-sea structure formed by dispersing a polyester resin in a styrene-acrylic resin, the diameter of the dispersed particles are larger than 2 μm. Therefore, in this reference, although the fixing temperature can be lowered, a further improvement in a life of the toner cannot be sufficiently obtained.

Accordingly, there is an increasing demand for a binder for electrophotography which is excellent in the low-temperature fixing ability and the offset resistance, has an environmental stability in a tribo electric charge and an image quality, which provides an excellent durability in the resulting toner.

SUMMARY OF THE INVENTION

Accordingly, an object of the present invention is to provide a method for producing a binder resin having an excellent environmental stability with respect to the tribo electric charge and the image quality.

Another object of the present invention is to provide a toner for electrophotography using such a binder resin.

As a result of intense research in view of the above problems, the present inventors have found that a binder resin having a good environmental stability in the tribo electric charge and the image quality can be produced by the steps of blending the starting material monomer mixtures for the two polymerization reactions types in advance, and concurrently carrying out the two polymerization reactions by using, as crosslinking agents, a compound which can react with both of the starting material monomers for the two polymerization reaction types and a tricarboxylic or higher polycarboxylic acid. The present invention is completed based upon this finding.

More particularly, the gist of the present invention is as follows:

(1) A method of producing a binder resin comprising the steps of blending in advance (a) a starting material monomer mixture for two polymerization reaction types, (b) a compound which can react with both of the starting material monomers for the two polymerization reaction types, and (c) a tricarboxylic or higher polycarboxylic acid or a derivative thereof, said two polymerization reaction types having independent reaction paths to each other in one reaction vessel; and concurrently carrying out the two polymerization reactions in one reaction vessel; and (2) A toner for electrophotography using the binder resin produced by the method mentioned above.

According to the present invention, the binder resin which has an excellent environmental stability in the tribo electric charge and the image quality, and also has good pulverizability and transparency can be produced. Moreover, in a fixing method using a heat roller, fixing at a low temperature can be performed without using an offset inhibiting liquid. By using such a binder resin, a toner for electrophotography and a developer having excellent performance can be obtained.

DETAILED DESCRIPTION OF THE INVENTION

In the present invention, the two polymerization reaction types are those which are carried out independently to each other in each reaction path. It is preferred that one is a condensation polymerization type and the other is an addition polymerization type.

A typical example of the condensation polymerization type is a polymerization reaction system in which polyesters, polyester-polyamides, or polyamides are obtained by the condensation polymerization. A typical example of the addition polymerization is a polymerization reaction system in which vinyl resins are obtained by radical polymerization.

Among those polymers, the polyesters can be formed between starting material monomers of an alcohol and a carboxylic acid, a carboxylic acid anhydride or a carboxylic acid ester.

Here, examples of the dihydric alcohol components include bisphenol A alkylene oxide adducts such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A and other dihydric alcohol components.

Examples of the trihydric or higher polyhydric alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and other trihydric or higher polyhydric alcohol components.

Among these alcohol components, bisphenol A alkylene oxide adducts, ethylene glycol, 1,2-propylene glycol, 1,3-propylene glycol, and neopentyl glycol are preferably used.

In the present invention, these dihydric alcohol monomers and trihydric or higher polyhydric alcohol monomers may be used singly or in combination.

As for the acid components, examples thereof include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, and acid anhydrides thereof, lower alkyl esters thereof and other dicarboxylic acid components, with a preference given to maleic acid, fumaric acid, terephthalic acid, and alkenyl succinic acids.

Among the starting material monomers for forming the amide components in the polyester-polyamides or the polyamides which can be obtained by the condensation polymerization, examples of the starting material monomers include polyamines such as ethylenediamine, pentamethylenediamine, hexamethylenediamine, diethylenetriamine, iminobispropylamine, phenylenediamine, xylylenediamine, and triethylenetetramine; amino carboxylic acids such as 6-aminocaproic acid and ε-caprolactam; and amino alcohols such as propanolamine. Among these starting material for forming the amide components, a preference is given to hexamethylenediamine and ε-caprolactam.

Typical examples of the monomers used for forming the vinyl resins obtained by the addition polymerization include styrene and styrene derivatives such as styrene, o-methylstyrene, m-methylstyrene, p-methylstyrene, α-methylstyrene, p-ethylstyrene, 2,4-dimethylstyrene, p-chlorostyrene, and vinylnaphthalene; ethylenic unsaturated monoolefins such as ethylene, propylene, butylene and isobutylene; vinyl esters such as vinyl chloride, vinyl bromide, vinyl fluoride, vinyl acetate, vinyl propionate, vinyl formate, and vinyl caproate; ethylenic esters thereof such as methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl α-chloroacrylate, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate and diethylaminoethyl methacrylate; vinyl ethers such as vinyl methyl ether; vinylidene halides such as vinylidene chloride; and N-vinyl compounds such as N-vinylpyrrole and N-vinylpyrrolidone. In the present invention, a preference is given to styrene, α-methylstyrene, propylene, methyl acrylate, butyl acrylate, 2-ethylhexyl acrylate, stearyl acrylate, methyl methacrylate, butyl methacrylate, and 2-hydroxyethyl methacrylate.

Examples of the polymerization initiators which are used in the production of the vinyl resins include azo and diazo polymerization initiators such as 2,2'-azobis(2,4-dimethylvaleronitrile), 2,2'-azobisisobutyronitrile, 1,1'-azobis(cyclohexane-1-carbonitrile) and 2,2'-azobis-4-methoxy-2,4-dimethylvaleronitrile and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide and dicumyl peroxide.

For the purposes of controlling the molecular weight or molecular weight distribution of the polymer, or controlling the reaction time, two or more polymerization initiators may be used in combination.

The amount of the polymerization initiator used is 0.1 to 20 parts by weight, preferably 1 to 10 parts by weight, based on 100 parts by weight of the polymerizable monomers.

In the present invention, when the molecular weight of the resin obtained in one of the reaction paths is made low, the pulverizability of the obtained binder resin can be improved.

Particularly when the number-average molecular weight of the addition polymerization-type resin is not more than 11,000, it is highly effective in improving the pulverizability of the binder resin. In order to adjust the number-average molecular weight to not more than 11,000, large amounts of the polymerization initiators may be added, or a chain transfer agent may be used.

Also, in the present invention, the compound which can react with both of the starting material monomers for the two polymerization reaction types and the tricarboxylic or higher polycarboxylic acid or the derivative thereof can be used as crosslinking agents. Among them, examples of compounds which can react with both of the starting material monomers for the two polymerization reaction types include compounds represented by the general formulas (I) and (II) shown below:

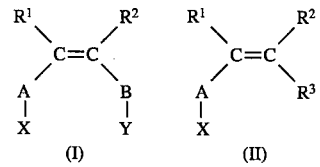

wherein $R^1$, $R^2$ and $R^3$, which may be identical or different, independently represent hydrogen atom, hydroxyl group, a substituted or unsubstituted alkyl group, alkoxyl group, aryl group or vinyl group, or a halogen atom, which may together form a ring; A and B, which may be identical or different, independently represent an alkylene group represented by the following general formula (III) or a phenylene group represented by the following general formula (IV):

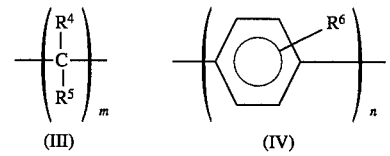

wherein $R^4$, $R^5$ and $R^6$, which may be identical or different, independently represent hydrogen atom, hydroxyl group, a substituted or unsubstituted alkyl group, alkoxyl group, aryl group or vinyl group, or a halogen atom, which may together form a ring; m is an integer of 0 to 5; and n is an integer of 0 to 2, and wherein X and Y, which may be identical or different, independently represent —COOR$^7$ or —OR$^8$, wherein $R^7$ and $R^8$ independently represent hydrogen atom or a substituted or unsubstituted lower alkyl group.

Here, the compounds mentioned above can react with both of the starting material monomers for the two polymerization reaction types. When two or more starting material monomers for one polymerization reaction type are used, the compounds may react with at least one of these monomers.

In the general formulas (I) and (II), with respect to the groups represented by $R^1$ to $R^6$, the alkyl groups, which may be linear or branched, have carbon atoms of preferably 1 to 6, particularly 1 to 4, and examples thereof include methyl group, ethyl group, n-propyl group, i-propyl group, n-butyl group and tert-butyl group. These alkyl groups may be substituted with such groups as phenyl group, naphthyl group and hydroxyl group. Examples of the alkoxyl groups include methoxy group, ethoxy group, n-propoxy group, i-propoxy group and t-butoxy group, which may be substituted with such groups as hydroxyl group and carboxyl group. Examples of the aryl groups include phenyl group, naphthyl group and benzyl group, which may be substituted with such groups as methyl group, ethyl group, methoxy group, ethoxy group, carboxyl group and hydroxyl group. The vinyl group may be substituted with such groups as hydroxyl group, phenyl group, an alkyl group, an alkoxyl group and carboxyl group. Examples of the halogen atoms include fluorine atom, chlorine atom, bromine atom and iodine atom, with a particular preference given to the chlorine atom and the bromine atom.

The lower alkyl groups represented by $R^7$ and $R^8$ have carbon atoms 1 to 4, and examples thereof include methyl group and ethyl group, which may be substituted with such a group as hydroxyl group.

Typical examples of the compounds represented by the general formulas (I) and (II) include Compounds (1) to (36) shown below:

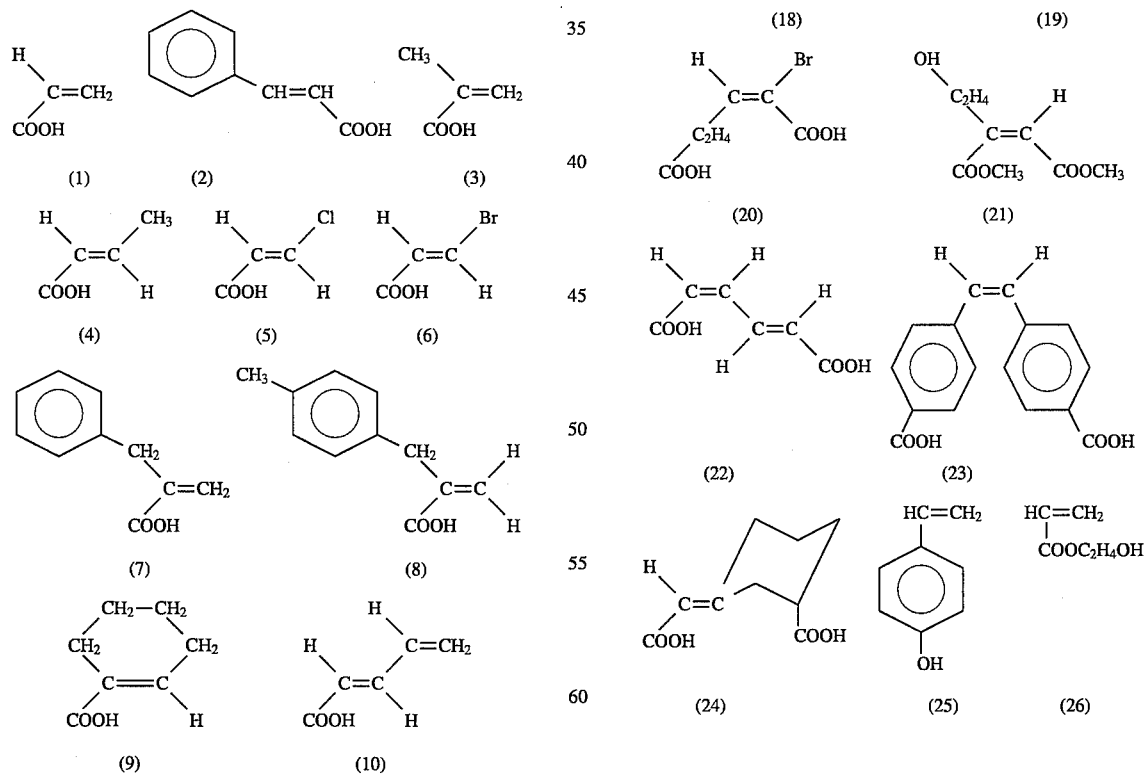

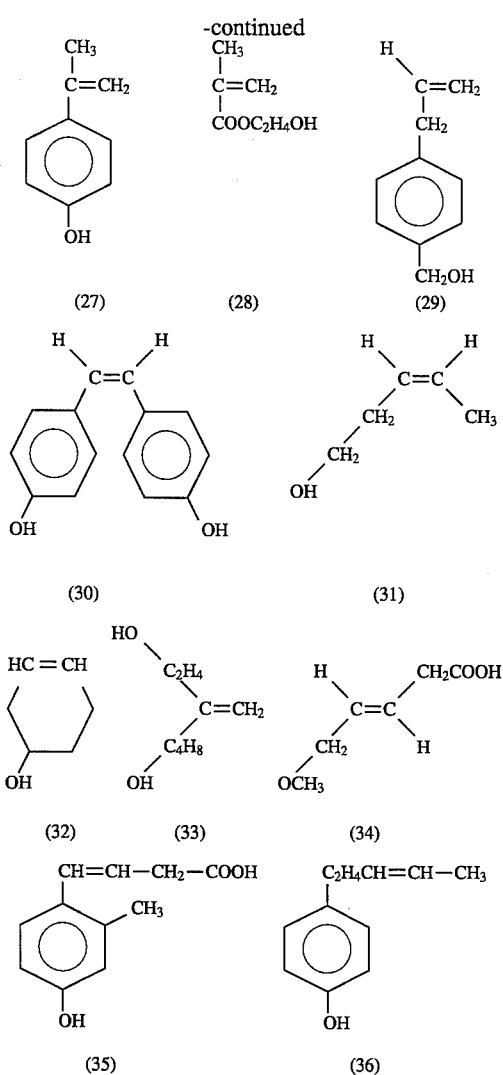

Besides the above compounds, lower alkyl esters of the above-exemplified ethylenic monocarboxylic acids, and anhydrides of the above-exemplified ethylenic dicarboxylic acids are also included.

Examples of the tricarboxylic or higher polycarboxylic acids or derivatives thereof used as the crosslinking agents in the present invention include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, and acid anhydrides thereof, lower alkyl esters thereof and other tricarboxylic or higher polycarboxylic acid components. Among them, in particular, 1,2,4-benzenetricarboxylic acid, namely trimellitic acid, or a derivative thereof is preferably used because it is inexpensive and the reaction control is easy.

Among these crosslinking agents, the compound, which can react with both of the starting material monomers for the two polymerization reaction types, is effective for making the dispersed particle diameter of the resin at completion of the reaction small. Such a compound may be added in an amount of preferably 0.5 to 10% by weight, particularly 0.5 to 5% by weight, based on the condensation polymerization-type monomers used as a starting material.

Also, the tricarboxylic or higher polycarboxylic acid or the derivative thereof is effective for controlling the degree of polymerization of the resin, and it may be added in an amount of preferably 0.2 to 30% by weight, particularly 0.5 to 30% by weight, based on the condensation polymerization-type monomers used as a starting material.

In the present invention, when these crosslinking agents are used in the ranges mentioned above, the resulting binder resin becomes completely homogeneous, free from an islands-sea structure. In certain types of crosslinking agents, a resin may have dispersed particles having an average diameter of not more than 2 μm, showing a good dispersion state.

When the amount of these crosslinking agents used is too large, gelation is likely to take place during the polymerization reaction. On the contrary, when the amount used is too small, in the heat roller fixing, an offset phenomenon is likely to undesirably take place, wherein a part of the toner is not completely fixed on a paper but rather adheres to the surface of a roller, so that the toner is transferred to a subsequent paper.

In particular, when the amount of the compound which can react with both of the starting material monomers for the two polymerization reaction types is too small, the two polymerization reaction-type polymers become incompatible with each other, so that a resin having a large islands-sea structure is undesirably obtained. Therefore, the coloring agent cannot be well dispersed in these resins, thereby undesirably causing such troubles as background or unevenness in the printed images.

In the present invention, by carrying out the two independent reactions concurrently in one reaction vessel, binder resins in which two kinds of resins are sufficiently blended and dispersed can be obtained.

In the concurrent polymerization reactions mentioned above, both of the polymerization reactions do not have to proceed or terminate at the same time, and the reaction temperature and time can be suitably selected so as to proceed or terminate each reaction according to each of the reaction mechanisms.

The polymerization reaction is, for example, carried out by the method comprising the steps of adding dropwise a mixture comprising a starting material monomer, crosslinking agents and a polymerization initiator for the vinyl resins to a starting material monomer mixture for polyesters, polyester-polyamides, or polyamides under temperature conditions appropriate for the addition polymerization reaction, the condensation polymerization being partly carried out concurrently with the addition polymerization reaction; keeping the temperature of the obtained mixture under said temperature conditions to complete only the addition polymerization reaction; and then raising the reaction temperature to increase degree of the condensation polymerization. Here, although the temperature conditions appropriate for the addition polymerization reaction may vary depending upon the types of the polymerization initiators, they are normally 50° to 180° C., and the optimum temperature for increasing degree of the condensation polymerization is normally 190° to 270° C.

In the present invention, the weight ratio of the condensation polymerization-type resins to the addition polymerization-type resins or the weight ratio of the condensation polymerization-type resin monomers to the addition polymerization-type resin monomers is preferably in the range from 50/50 to 95/5, particularly from 70/30 to 90/10 in order to well disperse the addition polymerization-type resin.

The binder resin thus obtained preferably has a softening point of 70° to 150° C., more preferably 90° to 150° C., a glass transition temperature of 50° to 80° C., more preferably 52° to 70° C., and an acid value of not more than 20 KOH mg/g, more preferably not more than 15 KOH mg/g. The softening point, the glass transition temperature and the acid value may be easily controlled to the above ranges by adjusting the amounts of the polymerization initiators and the catalysts in the starting material monomer mixture, or by selecting suitable reaction conditions.

When the binder resin obtained according to the present invention is used for the production of toners, for example, it may be added together with a coloring agent, and if necessary, such additives as a charge control agent and a magnetic particulate.

Examples of the coloring agents used in the present invention include various carbon blacks which may be produced by a thermal black method, an acetylene black method, a channel black method, and a lamp black method; a grafted carbon black, in which the surface of carbon black is coated with a resin; a nigrosine dye, Phthalocyanine Blue, Permanent Brown FG, Brilliant Fast Scarlet, Pigment Green B, Rhodamine-B Base, Solvent Red 49, Solvent Red 146, and Solvent Blue 35, and the mixtures thereof. The coloring agent is usually used in an amount of about 1 to 15 parts by weight based on 100 parts by weight of the binder resin.

In the present invention, if necessary, as the charge control agents either the positive charge control agents or the negative charge control agents may be used. The positive charge control agents are not particularly limitative, and examples thereof include nigrosine dyes such as "Nigrosine Base EX" (manufactured by Orient Chemical), "Oil Black BS" (manufactured by Orient Chemical), "Oil Black SO" (manufactured by Orient Chemical), "Bontron N-01" (manufactured by Orient Chemical), "Bontron N-07" (manufactured by Orient Chemical), and "Bontron N-11" (manufactured by Orient Chemical); triphenylmethane dyes containing tertiary amines as side chains; quaternary ammonium salt compounds such as "Bontron P-51" (manufactured by Orient Chemical), cetyltrimethylammonium bromide, and "Copy Charge PX VP435" (manufactured by Hoechst); polyamine resins such as "AFP-B" (manufactured by Orient Chemical); and imidazole derivatives such as "PLZ-2001" (manufactured by Shikoku Kasei K.K.) and "PLZ-8001" (manufactured by Shikoku Kasei K.K.), with a preference given to Bontron N-07.

Negative charge control agents to be added are not particularly limitative, and examples thereof include azo dyes containing metals such as "Varifast Black 3804" (manufactured by Orient Chemical), "Bontron S-31" (manufactured by Orient Chemical), "Bontron S-32" (manufactured by Orient Chemical), "Bontron S-34" (manufactured by Orient Chemical), "Bontron S-36" (manufactured by Orient Chemical), "T-77" (manufactured by Hodogaya Kagaku) and "Aizenspilon Black TRH" (manufactured by Hodogaya Kagaku); copper phthalocyanine dye; metal complexes of alkyl derivatives of salicylic acid such as "Bontron E-81" (manufactured by Orient Chemical), "Bontron E-82" (manufactured by Orient Chemical), "Bontron E-84" (manufactured by Orient Chemical), and "Bontron E-85" (manufactured by Orient Chemical); and quaternary ammonium salts such as "Copy Charge NX VP434" (manufactured by Hoechst); nitroimidazole derivatives, with a preference given to Bontron S-34, T-77 and Aizenspilon Black TRH.

The above charge control agents may be added to the binder resin in an amount of 0.1 to 8.0% by weight, preferably 0.2 to 5.0% by weight.

Also, preferred examples of the offset inhibitors include waxes such as polyolefins, which may be added in an amount of preferably 1 to 5 parts by weight, based on 100 parts by weight of the binder resin. Examples of the polyolefins include polyethylene and polypropylene, with a preference give to those having relatively low molecular weights, and particularly those having molecular weights of 3,000 to 15,000 as determined by the osmometric method are preferred. Also, the polyolefins have softening points of preferably 70° to 150° C., particularly 120° to 150° C. as determined by the ring and ball method.

In the conventional toners, blending of these waxes have been difficult due to their poor compatibility with the binder resin. By contrast, in the present invention, such waxes can be easily blended. By containing these waxes in the toner of the present invention, the low-temperature fixing ability of the toner becomes more excellent.

Further, in the production of the toners, there may be added property improvers, for instance, fluidity improvers such as hydrophobic silica. When the binder resin described above is used for the production of the toners in the present invention, these property improvers are not necessary. Even if they are used, they are contained in a small amount.

The toners having an average particle size of 5 to 15 µm can be obtained by the steps of uniformly dispersing the binder resin obtained according to the present invention, a coloring agent, and in certain cases, property improvers, melt-kneading the obtained mixture, cooling kneaded mixture, pulverizing the cooled mixture, and then classifying the pulverized product, all of the steps being carried out by known methods. The toners may be used as a nonmagnetic one-component developer. Alternatively, the toners may be blended with particulate magnetic materials such as iron oxide carriers, spherical iron oxide carrier or ferritic carriers, or the above carriers provided with a resin coating, to give a dry-type two-component developer.

A magnetic toner can be prepared by adding a particulate magnetic material to the starting material containing the binder resin obtained according to the present invention used in toner production. Examples of the particulate magnetic materials include ferromagnetic metals such as iron, i.e., ferrite or magnetite, cobalt, and nickel, alloys thereof, and compounds containing these elements; alloys not containing any ferromagnetic element which become ferromagnetic by suitable thermal treatment, for example, so-called "Heusler alloys" containing manganese and copper such as a manganese-copper-aluminum alloy, and a manganese-copper-tin alloy; and chromium dioxide, with a preference given to the compounds containing ferromagnetic materials, and a particular preference to magnetite. Such a magnetic material is uniformly dispersed in the starting material containing the above binder resin in the form of a fine powder having an average particle diameter of 0.1 to 1 µm. The content of these magnetic materials is 20 to 70 parts by weight, preferably 30 to 70 parts by weight, based on 100 parts by weight of the binder resin.

EXAMPLES

The present invention is hereinafter described in more detail by means of the following working examples, comparative examples and test example, but the present invention is not restricted to these examples.

In these examples, the acid value and the glass transition temperature of each of the obtained binder resin are measured by the following methods.

Acid Value

The acid value is measured by the method according to JIS K0070.

Glass Transition Temperature (Tg)

The glass transition temperature (Tg) refers to the temperature of an intersection of the extension of the baseline of not more than the glass transition temperature and the tangential line showing the maximum inclination between the kickoff of the peak and the top thereof as determined with a sample using a differential scanning calorimeter ("DSC Model 200," manufactured by Seiko Instruments, Inc.), at a heating rate of 10° C./min. The sample is treated before measurement using the DSC by raising its temperature to 100° C., keeping at 100° C. for 3 minutes, and cooling the hot sample at a cooling rate of 10° C./min. to room temperature.

Example 1

410 g (3.94 mol) of styrene and 90 g (0.49 mol) of 2-ethylhexyl acrylate as monomers for forming vinyl resins, 30 g (0.42 mol) of acrylic acid as a crosslinking agent, and 20 g (0.12 mol) of azobisisobutyronitrile as a polymerization initiator are placed into a dropping funnel. 780 g (2.23 mol) of polyoxypropylene(2.2)-2,2-bis(4-hydroxyphenyl)propane, 76 g (0.28 mol) of isododecenyl succinic anhydride, 180 g (1.09 mol) of terephthalic acid, 30 g (0.16 mol) of 1,2,4-benzenetricarboxylic acid as a crosslinking agent, and 2 g (8.0 mmol) of dibutyltin oxide are placed in a three-liter four-neck glass flask equipped with a thermometer, a stainless steel stirring rod, a reflux condenser and a nitrogen inlet tube. To the mixture contained in the glass flask, the mixture comprising the monomers for forming the vinyl resins, the crosslinking agents and the polymerization initiator is added dropwise from the above dropping funnel over a period of 4 hours while heating the contents at 135° C. in a mantle heater in a nitrogen gas atmosphere and stirring the contents. The reaction mixture is matured for 5 hours while keeping the temperature at 135° C., and then the temperature is elevated to 230° C. to react the components.

The degree of polymerization is monitored from a softening point measured by the method according to ASTM E 28-67, and the reaction is terminated when the softening point reaches 120° C.

The obtained resin has a glass transition temperature (Tg) with a single peak at 60° C. The obtained resin is completely homogeneous, free from an islands-sea structure. Here, the structure of the resin can be determined by the steps of slicing the resin having a diameter of 0.2 mm using a microtome to a thickness of 150 nm, and observing the obtained thin slices using a transmission scanning electron microscope ("JEM-2000," manufactured by JEOL (Nihon Denshi Kabushiki Kaisha)).

The acid value is 8.0 KOH mg/g.

This obtained resin is referred to as "Binder Resin A."

Example 2

400 g (3.85 mol) of styrene and 77 g (0.42 mol) of 2-ethylhexyl acrylate as monomers for forming vinyl resins, 39.1 g (0.34 mol) of fumaric acid as a crosslinking agent, 15 g (0.06 mol) of α-methylstyrene dimer as a chain transfer agent, and 25 g (0.09 mol) of dicumyl peroxide as a polymerization initiator are placed into a dropping funnel. 756 g (2.16 mol) of polyoxypropylene(2.2)-2,2-bis(4-hydroxyphenyl)propane, 40.3 g (0.34 mol) of hexamethylenediamine, 210 g (1.26 mol) of isophthalic acid, 63 g (0.34 mol) of 1,2,4-benzenetricarboxylic acid as a crosslinking agent, and 3 g (12.0 mmol) of dibutyltin oxide are placed in a three-liter four-neck glass flask equipped with a thermometer, a stainless steel stirring rod, a reflux condenser and a nitrogen inlet tube. The subsequent procedures are carried out under the same polymerization conditions as in Example 1.

The obtained resin has a glass transition temperature (Tg) with a single peak at 63° C., and the average diameter of the dispersed particles of the vinyl resin is 0.5 μm, showing a good dispersion state. The acid value is 5.5 KOH mg/g.

This obtained resin is referred to as "Binder Resin B."

Example 3

350 g (3.37 mol) of styrene and 150 g (1.29 mol) of butyl methacrylate as monomers for forming vinyl resins, 55 g (0.38 mol) of methacrylic acid as a crosslinking agent, and 25 g (0.09 mol) of dicumyl peroxide as a polymerization initiator are placed into a dropping funnel. 328.8 g (3.15 mol) of neopentyl glycol, 328.8 g (1.97 mol) of isophthalic acid, 104 g (0.55 mol) of 1,2,4-benzenetricarboxylic acid as a crosslinking agent, and 3 g (12.0 mmol) of dibutyltin oxide are placed in a three-liter four-neck glass flask equipped with a thermometer, a stainless steel stirring rod, a reflux condenser and a nitrogen inlet tube. The subsequent procedures are carried out under the same polymerization conditions as in Example 1.

The obtained resin has a glass transition temperature (Tg) with a single peak at 63° C., and is homogeneous, free from an islands-sea structure.

The acid value is 9.0 KOH mg/g.

This obtained resin is referred to as "Binder Resin C."

Comparative Example 1

850 g of xylene is placed in a two-liter four-neck glass flask equipped with a thermometer, a stainless steel stirring rod, a reflux condenser and a nitrogen inlet tube. After replacing with a nitrogen gas, the temperature is elevated to 135° C.

700 g (6.73 mol) of styrene and 300 g (2.58 mol) of butyl methacrylate as monomers for forming vinyl resins and 50 g (0.19 mol) of dicumyl peroxide as a polymerization initiator are placed into a dropping funnel. To the contents of the glass flask, the above mixture is added dropwise from the above dropping funnel over a period of 4 hours while keeping the temperature at 135° C. The reaction mixture kept at 135° C. is matured for 5 hours, and then the temperature is elevated to 200° C. to react the components. Xylene is removed from the mixture under a reduced pressure, and the obtained product is taken out on a vat. After cooling the product, the cooled product is pulverized. The obtained resin has a softening point of 105° C. as measured by the method according to ASTM E28-67 and a glass transition temperature of 64° C.

650 g (1.86 mol) of polyoxypropylene(2.2)-2,2-bis(4-hydroxyphenyl)propane, 300 g (1.81 mol) of isophthalic acid and 2 g (8.0 mmol) of dibutyltin oxide are placed in a five-liter four-neck glass flask equipped with a thermometer, a stainless steel stirring rod, a reflux condenser and a nitrogen inlet tube, so that the mixture is allowed to react at 230° C. for homopolymerization.

The obtained polyester resin has an acid value of 12.6 KOH mg/g.

400 g of the vinyl resin obtained above and 600 g of the polyester resin are kneaded at 100° C. using a double-screw kneader. The resulting resin has a softening point of 121° C. and a glass transition temperature (Tg) with double peaks at 60° C. and 64° C. The average diameter of the dispersed particles of the vinyl resin is 12.8 μm, showing a large islands-sea structure. Also, the acid value is 9.8 KOH mg/g.

This obtained resin is referred to as "Binder Resin D."

Comparative Example 2

410 g (3.94 mol) of styrene and 90 g (0.49 mol) of 2-ethylhexyl acrylate as monomers for forming vinyl resins, and 20 g (0.12 mol) of azobisisobutyronitrile as a polymerization initiator are placed into a dropping funnel. 780 g (2.23 mol) of polyoxypropylene(2.2)-2,2-bis(4-hydroxyphenyl)propane, 76 g (0.28 mol) of isododecenyl succinic anhydride, 220 g (1.33 mol) of terephthalic acid, 30 g (0.16 mol) of 1,2,4-benzenetricarboxylic acid as a crosslinking agent, and 2 g (8.0 mmol) of dibutyltin oxide are placed in a three-liter four-neck glass flask equipped with a thermometer, a stainless steel stirring rod, a reflux condenser and a nitrogen inlet tube. To the mixture contained in the glass flask, the mixture comprising the monomers for forming the vinyl resins and the polymerization initiator is added dropwise from the above dropping funnel over a period of 4 hours while heating the contents at 135° C. in a mantle heater in a nitrogen gas atmosphere and stirring the contents. The reaction mixture is matured for 5 hours while keeping the temperature at 135° C., and then the temperature is elevated to 230° C. to react the components.

The degree of polymerization is monitored from a softening point measured by the method according to ASTM E 28-67, and the reaction is terminated when the softening point reaches 120° C.

The obtained resin has a glass transition temperature (Tg) with a single peak at 63° C., and the average diameter of the dispersed particles of the vinyl resin is 7.0 μm, showing a large islands-sea structure.

The acid value is 8.0 KOH mg/g.

This obtained resin is referred to as "Binder Resin E."

Comparative Example 3

400 g (3.85 mol) of styrene and 77 g (0.42 mol) of 2-ethylhexyl acrylate as monomers for forming vinyl resins, 15 g (0.06 mol) of α-methylstyrene dimer as a chain transfer agent, and 25 g (0.09 mol) of dicumyl peroxide as a polymerization initiator are placed into a dropping funnel. 396 g (1.13 mol) of polyoxypropylene(2.2)-2,2-bis(4-hydroxyphenyl)propane, 166 g (1.00 mol) of isophthalic acid, 14.8 g (0.16 mol) of glycerol as a crosslinking agent, and 2 g (8.0 mmol) of dibutyltin oxide are placed in a three-liter four-neck glass flask equipped with a thermometer, a stainless steel stirring rod, a reflux condenser and a nitrogen inlet tube. The subsequent procedures are carried out under the same polymerization conditions as in Example 1.

The degree of polymerization is monitored from a softening point measured by the method according to ASTM E 28-67, and the reaction is terminated when the softening point reaches 120° C.

The obtained resin has a glass transition temperature (Tg) with a single peak at 64° C., but the average diameter of the dispersed particles of the vinyl resin is 7.9 μm, and a large islands-sea structure is observed. The acid value is 9.7 KOH mg/g.

This obtained resin is referred to as "Binder Resin F."

Comparative Example 4

810 g (7.79 mol) of styrene and 359 g (1.95 mol) of 2-ethylhexyl acrylate as monomers for forming vinyl resins, 20 g (0.12 mol) of azobisisobutyronitrile as a polymerization initiator, and 10 g (0.09 mol) of fumaric acid as a crosslinking agent, are placed into a dropping funnel. 380 g (1.09 mol) of polyoxypropylene(2.2)-2,2-bis(4-hydroxyphenyl)propane, 36 g (0.13 mol) of isododecenyl succinic anhydride, 130 g (0.78 mol) of terephthalic acid, and 1 g (4.0 mmol) of dibutyltin oxide are placed in a three-liter four-neck glass flask equipped with a thermometer, a stainless steel stirring rod, a reflux condenser and a nitrogen inlet tube. To the mixture contained in the glass flask, the mixture comprising the monomers for forming the vinyl resins, the crosslinking agents and the polymerization initiator is added dropwise from the above dropping funnel over a period of 4 hours while heating the contents at 135° C. in a mantle heater in a nitrogen gas atmosphere and stirring the contents. The reaction mixture is matured for 5 hours while keeping the temperature at 135° C., and then the temperature is elevated to 230° C. to react the components.

The degree of polymerization is monitored from a softening point measured by the method according to ASTM E 28-67, and the reaction is terminated when the softening point reaches 120° C.

The obtained resin has a glass transition temperature (Tg) with a single peak at 60° C., but the average diameter of the dispersed particles of the polyester resin is 8.0 μm, and a large islands-sea structure is observed.

The acid value is 6.0 KOH mg/g.

This obtained resin is referred to as "Binder Resin G."

Test Example

Each of the materials having the composition shown in Table 1 is blended with a Henschel mixer in advance, and the obtained mixture is melt-blended using a double-screw extruder. After cooling the extruded product, the cooled product is pulverized and classified to give an untreated toner having an average particle diameter of 11 μm.

TABLE 1

| Components | Untreated Toner (parts by weight) | | | | | | | |
|---|---|---|---|---|---|---|---|---|
| | 1 | 2 | 3 | 4 | 5 | 6 | 7 | 8 |
| Binder Resin | | | | | | | | |
| A | 90 | | | 90 | | | | |
| B | | 90 | | | | | | |
| C | | | 90 | | | | | |
| D | | | | | 90 | | | |
| E | | | | | | 90 | | |
| F | | | | | | | 90 | |
| G | | | | | | | | 90 |
| Carbon Black #44[1] | 7 | 7 | 7 | 7 | 7 | 7 | 7 | 7 |
| BONTRON S-34 ™[2] | 2 | 2 | 2 | | 2 | 2 | 2 | 2 |
| BONTRON N-07 ™[3] | | | | 2 | | | | |

Notes:
[1] Manufactured by Mitsubishi Kasei Corporation.
[2] Negative charge control agent (manufactured by Orient Chemical)
[3] Positive charge control agent (manufactured by Orient Chemical)

0.1 parts by weight of hydrophobic silica "H-2000" (manufactured by Wacker Chemical Co.) is blended with 100 parts by weight of each of the obtained untreated toners 1 to 4 using a Henschel mixer to give Toners 1 to 4. Similarly, each of the untreated toners 5 to 8 are surface-treated to give Comparative Toners 1 to 4.

A developer is prepared by blending 39 parts by weight of each of the toners with 1261 parts by weight of spherical ferrite powder coated with styrene-methyl methacrylate resin having an average particle diameter of 100 μm. Specifically, each of the developers prepared as described above is loaded on a commercially available electrophotographic copying machine to form images. The copying machine is equipped with an amorphous selene photoconductor for Toners 1, 2, 3, Comparative Toners 1, 2, 3 and 4, or an organic photoconductor for Toner 4; and a fixing roller having a rotational speed of 255 mm/sec. A fixing device thereof can be set at variable heat roller temperature and an oil applying device is removed therefrom. The fixing ability, the pulverizability, the transparency, the offset resistance and the printing durability are evaluated by the following methods.

(1) Fixing ability of the toners

The fixing ability is evaluated by determining the lowest fixing temperature.

The lowest fixing temperature used herein is the temperature of the fixing roller at which the fixing ratio of the toner exceeds 70%. This fixing ratio of the toner is determined by placing a load of 500 g on a sand-rubber eraser (LION No. 502) having a bottom area of 15 mm× 7.5 mm which contacts the fixed toner image, placing the loaded eraser on a fixed toner image obtained in the fixing device, moving the loaded eraser on the image backward and forward five times, measuring the optical reflective density of the eraser-treated image with a reflective densitometer manufactured by Macbeth Co., and then calculating the fixing ratio from this density value and a density value before the eraser treatment using the following equation.

$$\text{Fixing ratio (\%)} = \frac{\text{Image density after eraser treatment}}{\text{Image density before eraser treatment}} \times 100$$

By controlling the fixing temperature from 100° C. to 240° C., the fixing ability of the formed images are evaluated. The results are shown in Table 2.

(2) Pulverizability of the resin

The resin obtained after the usual pulverization process is classified to give a 16-mesh-passed and 20-mesh-on resin powder. 30.00 g of the resin powder thus classified is accurately weighed, and the resin powder is pulverized for 15 seconds with a coffee mill ("Type HR-2170," manufactured by Philips). Thereafter, the obtained milled resin powder is classified with a 32-mesh sieve, and the weight [(A) g] of the mesh-on resin is accurately weighed. The remaining percentage (%) is calculated from this weight by the following equation:

The remaining percentage (%) =

$$\frac{A\ (g)}{\text{Weight (g) of resin before pulverizing with coffee mill (=30.00 g)}}$$

The above procedures are carried out three times, and an average remaining percentage is calculated.

The following evaluation is employed:

⊙: Average remaining percentage being 0 to 15.0%.

o: Average remaining percentage being 15.1 to 30.0%.

Δ: Average remaining percentage being 30.1 to 45.0%.

x: Average remaining percentage being not less than 45.1%.

The results are shown in Table 2.

(3) Transparency of the resin

The resin obtained at termination of the reaction is placed in a disc-shaped die having a thickness of 10 mm and a diameter of 60 mm and then air-cooled. After taking the resin out from the die, the transparency of the resin is evaluated by placing a paper with 1 cm×1 cm characters underneath one or more resin plates to determine whether the characters are visible through the resin plates.

The following evaluation is employed:

⊙: Characters are visible even through three resin plates.

o: Characters are visible through up to two resin plates.

Δ: Characters are visible through only one resin plate.

x: Characters are not visible even through one resin plate.

The results are shown in Table 2.

(4) Offset resistance

The offset resistance is evaluated by measuring the temperature of the low-temperature offset disappearance and the temperature of the high-temperature offset initiation. Specifically, copying tests are carried out by raising the temperature of the heat roller surface at an increment of 5° C. in the range from 70° C. to 220° C., and at each temperature, the adhesion of the toner onto the heat roller surface is evaluated with the naked eye. The results are shown in Table 2.

TABLE 2

| | Image Density | Lowest Fixing Temp. (°C.) | Low-Temp. Offset Disappearing Temp. (°C.) | High-Temp. Offset Initiating Temp. (°C.) | Pulverizability of the Resin | Transparency of the Resin |
| --- | --- | --- | --- | --- | --- | --- |
| Toner 1 | 1.40 | 125 | 120 | 220< | ⊙ | ⊙ |
| Toner 2 | 1.39 | 126 | 120 | 220< | ⊙ | ⊙ |
| Toner 3 | 1.41 | 126 | 120 | 220< | ⊙ | ⊙ |

TABLE 2-continued

|  | Image Density | Lowest Fixing Temp. (°C.) | Low-Temp. Offset Disappearing Temp. (°C.) | High-Temp. Offset Initiating Temp. (°C.) | Pulverizability of the Resin | Transparency of the Resin |
|---|---|---|---|---|---|---|
| Toner 4 | 1.38 | 125 | 120 | 220< | ⊚ | ⊚ |
| Comparative Toner 1 | 1.36 | 140 | 135 | 180 | ⊚ | Δ |
| Comparative Toner 2 | 1.37 | 128 | 125 | 220< | X | X |
| Comparative Toner 3 | 1.38 | 128 | 125 | 220< | ⊚ | Δ |
| Comparative Toner 4 | 1.39 | 131 | 125 | 220< | ⊚ | Δ |

(5) Printing durability of the toner

The tribo electric charge is measured by a blow-off type electric charge measuring device equipped with a Faraday cage, a capacitor and an electrometer as described below. First, W (g) (about 0.15 to 0.20 g) of the developer prepared above is placed into a brass measurement cell equipped with a stainless screen of 500 mesh, which is adjustable to any mesh size to block the passing of the carrier particles. Next, after aspirating from a suction opening for 5 seconds, blowing is carried out for 5 seconds under a pressure indicated by a barometric regulator of 0.6 kgf/cm², thereby selectively removing only the toner from the cell.

In this case, the voltage of the electrometer after 2 seconds from the start of blowing is defined as V (volt). Here, when the electric capacitance of the capacitor is defined as C (μF), the tribo electric charge Q/m of this toner can be calculated by the following equation:

$$Q/m(\mu C/g) = C \times V/m$$

Here, m is the weight of the toner contained in W (g) of the developer. When the weight of the toner in the developer is defined as T (g) and the weight of the developer as D (g), the toner concentration in a given sample can be expressed as T/D×100(%), and m can be calculated as shown in the following equation:

$$m(g) = W \times (T/D)$$

Each of the above developer is loaded on the above copying machine to conduct continuous copying test for 100,000 sheets under normal conditions of 23° C. and 50% RH or under high-temperature, high-humidity conditions of 35° C. and 85% RH. The changes in the tribo electric charge and the occurrence of background obtained during the printing durability test are evaluated. The results are shown in Table 3.

TABLE 3

|  | Tribo Electric Charge at Start (μc/g) | Changes in Tribo Electric Charge (after copying 100,000 Sheets) | | Image Quality | |
|---|---|---|---|---|---|
|  |  | Copying under Normal Conditions of 23° C., 50% RH | Copying under High-Temp., High-Humidity Conditions of 35° C., 85% RH | Copying under Normal Conditions of 23° C., 50% RH | Copying under High-Temp., High-Humidity Conditions of 35° C., 85% RH |
| Toner 1 | −18.8 | −1 | −2 | Excellent after Copying 100,000 Sheets | Excellent after Copying 100,000 Sheets |
| Toner 2 | −18.0 | −1 | −1 | Excellent after Copying 100,000 Sheets | Excellent after Copying 100,000 Sheets |
| Toner 3 | −20.0 | −1 | −3 | Excellent after Copying 100,000 Sheets | Excellent after Copying 100,000 Sheets |
| Toner 4 | +19.5 | +1 | −2 | Excellent after Copying 100,000 Sheets | Excellent after Copying 100,000 Sheets |
| Comparative Toner 1 | −18.6 | +14 | +15 | Intense Background Caused at 3,000 Sheets | Intense Background Caused at 500 Sheets |
| Comparative Toner 2 | −19.2 | −2 | −5 | Intense Background Caused at 70,000 Sheets | Intense Background Caused at 60,000 Sheets |
| Comparative | −20.1 | −2 | −4 | Intense Back- | Intense Back- |

TABLE 3-continued

|  | | Changes in Tribo Electric Charge (after copying 100,000 Sheets) | | Image Quality | |
| --- | --- | --- | --- | --- | --- |
|  | Tribo Electric Charge at Start ($\mu c/g$) | Copying under Normal Conditions of 23° C., 50% RH | Copying under High-Temp., High-Humidity Conditions of 35° C., 85% RH | Copying under Normal Conditions of 23° C., 50% RH | Copying under High-Temp., High-Humidity Conditions of 35° C., 85% RH |
| Toner 3 |  |  |  | ground Caused at 70,000 Sheets | ground Caused at 70,000 Sheets |
| Comparative Toner 4 | −19.1 | +3 | −6 | Intense Background Caused at 70,000 Sheets | Intense Background Caused at 60,000 Sheets |

As is clear from Table 2, Toners 1 to 4 according to the present invention have remarkably low lowest fixing temperatures and low-temperature offset disappearing temperatures. Therefore, Toners 1 to 4 according to the present invention have excellent stability in the resulting formed images and excellent offset resistance and thus show excellent heat efficiency. Also, the pulverizability of the resins used for Toners 1 to 4 is excellent, making the productivity of the toners high. Moreover, the resin has excellent transparency.

As is clear from Table 3, with respect to Toners 1 to 4 according to the present invention, the changes in the tribo electric charges are small and excellent image quality is maintained, when compared with Comparative Toners 1 to 4 under the normal conditions of 23° C. and 50% RH as well as under the high-temperature, high-humidity conditions of 35° C. and 80% RH. Therefore, Toners 1 to 4 according to the present invention is highly applicable for copying even under severe environmental conditions.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing a binder resin comprising the steps of:
    blending in advance a mixture comprising (a) starting material monomers for an addition polymerization resin; starting material monomers for a condensation polymerization resin; (b) a compound which reacts with both said starting material monomers for said addition polymerization resin and said starting material monomers for said condensation polymerization resin; and (c) a tricarboxylic or higher polycarboxylic acid, an acid anhydride thereof, or a lower alkyl ester thereof, in an amount sufficient to provide a binder resin which has no islands-sea structure, or has dispersed particles having an average diameter of not more than 2 μm; and
    concurrently carrying out addition polymerization and condensation polymerization in one reaction vessel to produce a binder resin having no islands-sea structure, or having dispersed particles having an average diameter of not more than 2 μm.

2. The method according to claim 1, wherein a weight ratio of the condensation polymerization resin to the addition polymerization resin is 50/50 to 95/5.

3. The method according to claim 1, wherein the condensation polymerization resin is selected from the group consisting of polyester resins, polyester-polyamide resins and polyamide resins, and wherein the addition polymerization resin is a vinyl resin obtained by radical polymerization.

4. The method according to claim 1, wherein a number-average molecular weight of the addition polymerization resin is not more than 11,000.

5. The method according to claim 1, wherein the compound which can react with both of said starting material monomers for addition polymerization resin and starting material monomers for condensation polymerization resin is a compound represented by the general formulas (I) and (II) shown below:

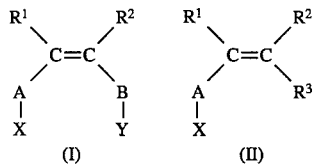

wherein $R^1$, $R^2$ and $R^3$, which may be identical or different, independently represent hydrogen atom, hydroxyl group, a substituted or unsubstituted alkyl group, alkoxyl group, aryl group or vinyl group, or a halogen atom, which may together form a ring; A and B, which may be identical or different, independently represent an alkylene group represented by the following general formula (III) or a phenylene group represented by the following general formula (IV):

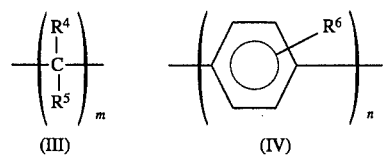

wherein $R^4$, $R^5$ and $R^6$, which may be identical or different, independently represent hydrogen atom, hydroxyl group, a substituted or unsubstituted alkyl group, alkoxyl group, aryl group or vinyl group, or a halogen atom, which may together form a ring; m is an integer of 0 to 5; and n is an integer of 0 to 2, and wherein X and Y, which may be identical or different, independently represent —$COOR^7$ or —$OR^8$, wherein $R^7$ represents a hydrogen atom, and $R^8$ represents a hydrogen atom or a substituted or unsubstituted lower alkyl group.

6. The method according to claim 5, wherein the compound which can react with both of said starting material monomers is selected from the group consisting of the Compounds (1) to (36):
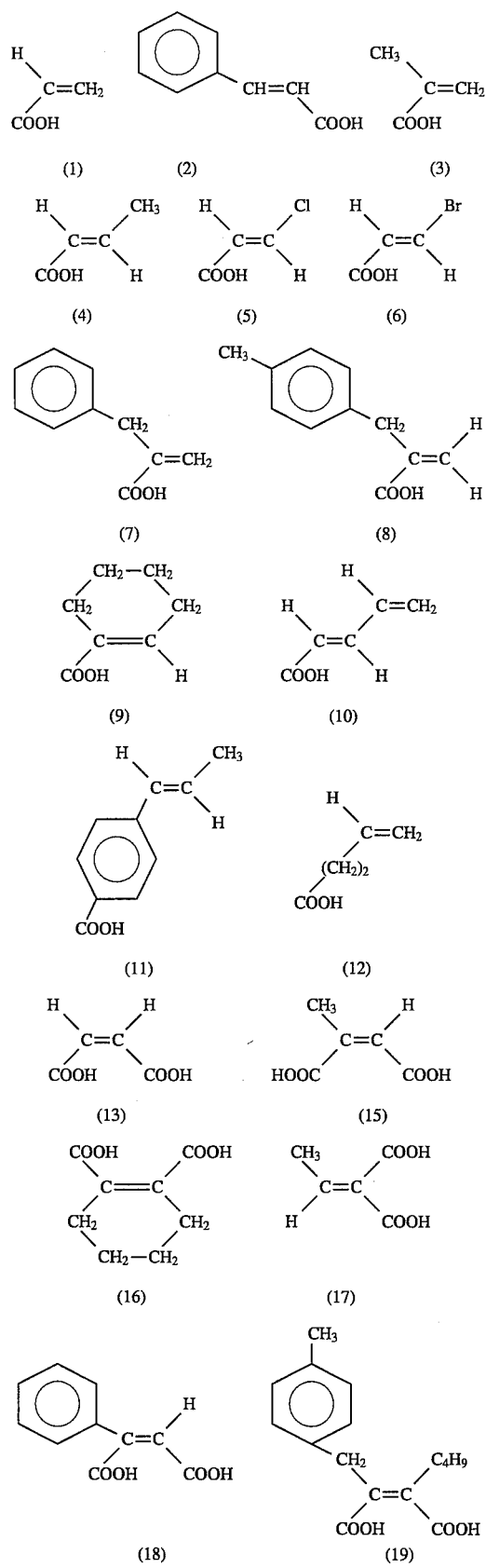
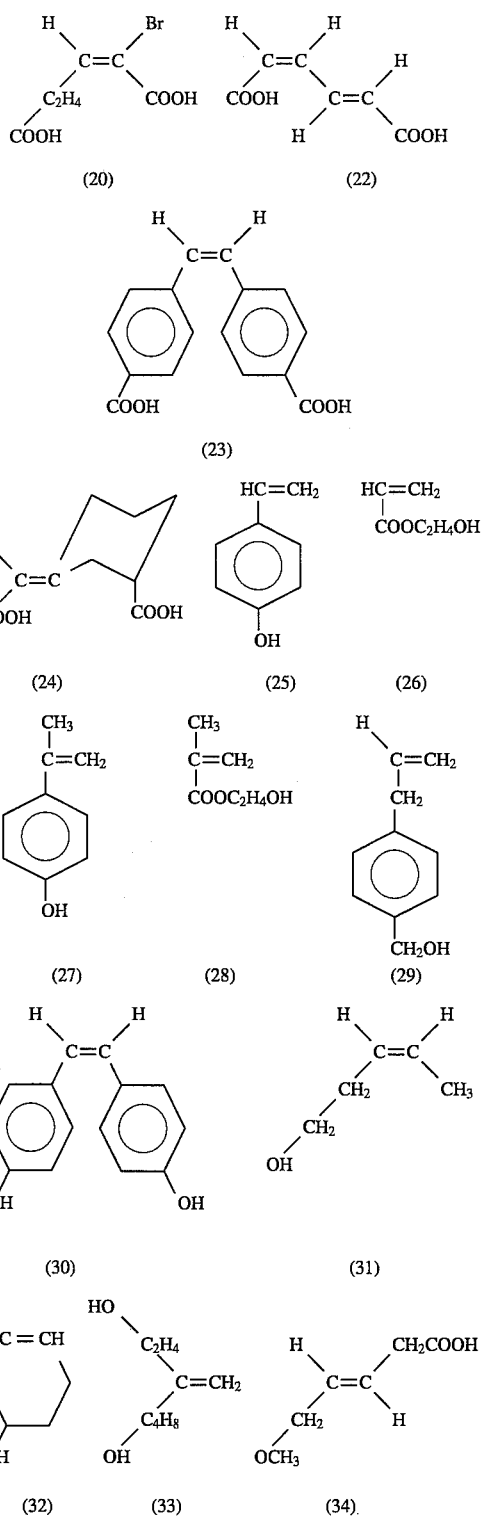

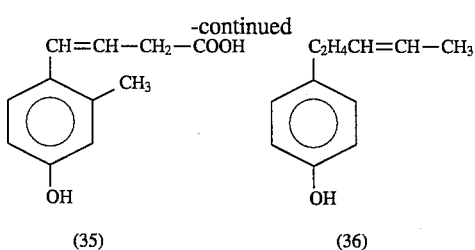

(35)  (36)

7. The method according to claim 1, wherein the tricarboxylic or higher polycarboxylic acid is trimellitic acid.

8. The method according to claim 1, wherein the compound which can react with both of said starting material monomers for addition polymerization resin and starting material monomers for condensation polymerization resin is added in an amount of 0.5 to 10% by weight, based on condensation polymerization-type monomers.

9. The method according to claim 1, wherein the tricarboxylic or higher polycarboxylic acid or the derivative thereof is added in an amount of 0.2 to 30% by weight, based on condensation polymerization-type monomers.

10. The method according to claim 1, wherein the obtained binder resin has an acid value of not more than 20 KOH mg/g.

11. The method according to claim 1, wherein the obtained binder resin has a softening point of 70° to 150° C. and a glass transition temperature of 50° to 80° C.

* * * * *